April 3, 1962  R. J. McCARTHY  3,028,535
RECHARGEABLE ELECTRIC BATTERIES
Filed Sept. 30, 1959  3 Sheets-Sheet 1

INVENTOR.
R. J. McCarthy
BY
Greene, Pineles & Durr
ATTORNEYS

*INVENTOR.*
R.J.McCarthy by *Greene, Pineles & Durr*

ATTORNEYS.

United States Patent Office 3,028,535
Patented Apr. 3, 1962

3,028,535
RECHARGEABLE ELECTRIC BATTERIES
Robert J. McCarthy, 10 Cedar Road, Katonah, N.Y.
Filed Sept. 30, 1959, Ser. No. 843,397
7 Claims. (Cl. 320—2)

This invention relates to electric batteries, and more particularly to rechargeable electric batteries for flashlights, electric shavers, photograph flash equipment, and analogous devices and appliances.

Conventional portable flashlights, millions upon millions of which have been and are being widely used throughout the world, are as a rule supplied with electric energy from replaceable dry-cell batteries. In recent years, there have also been available, small-capacity flashlights with a built-in, rechargeable battery and rectifying and charging circuits, which could be recharged by plugging in charging terminals of such small flashlight in a wall socket of a conventional, domestic alternating-current power supply.

For use in lieu of the replaceable dry cell of conventional flashlights, there have also been proposed rechargeable battery units having a built-in rectifying charging circuit and charging terminals arranged to be plugged in in a conventional alternating-current power supply for periodically recharging such battery. However, the heretofore proposed rechargeable battery units for conventional flashlights, are all deficient because they expose the user to electric shock when plugging in or removing the battery unit from the socket of the electric power supply, unless the user takes special precautions to assure that his body does not contact an exposed electrically-conducting metal part of such battery unit.

Among the objects of the invention is a rechargeable battery unit for a portable flashlight or analogous device embodying means for recharging it from an alternating-current power supply circuit, and which is free of danger of exposure to electric shock when gripping the battery unit when it is plugged in and connected to or removed from the electric power supply circuit.

Among the objects of the invention is a rechargeable battery unit for a flashlight or like device which is foolproof and simple to handle both when removing it and replacing it in the flashlight or like device, and when arranging it for plugging into a power supply socket for recharging its battery cell aggregate by the built-in rectifying and charging circuit.

The foregoing and other objects of the invention will be best understood from the following description of exemplifications thereof, reference being had to the accompanying drawings, wherein.

Figure 2:
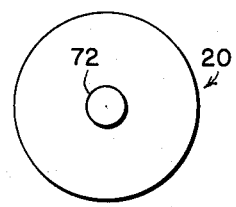
FIG. 2 is a top view of the battery unit of FIG. 1.
Figure 3:
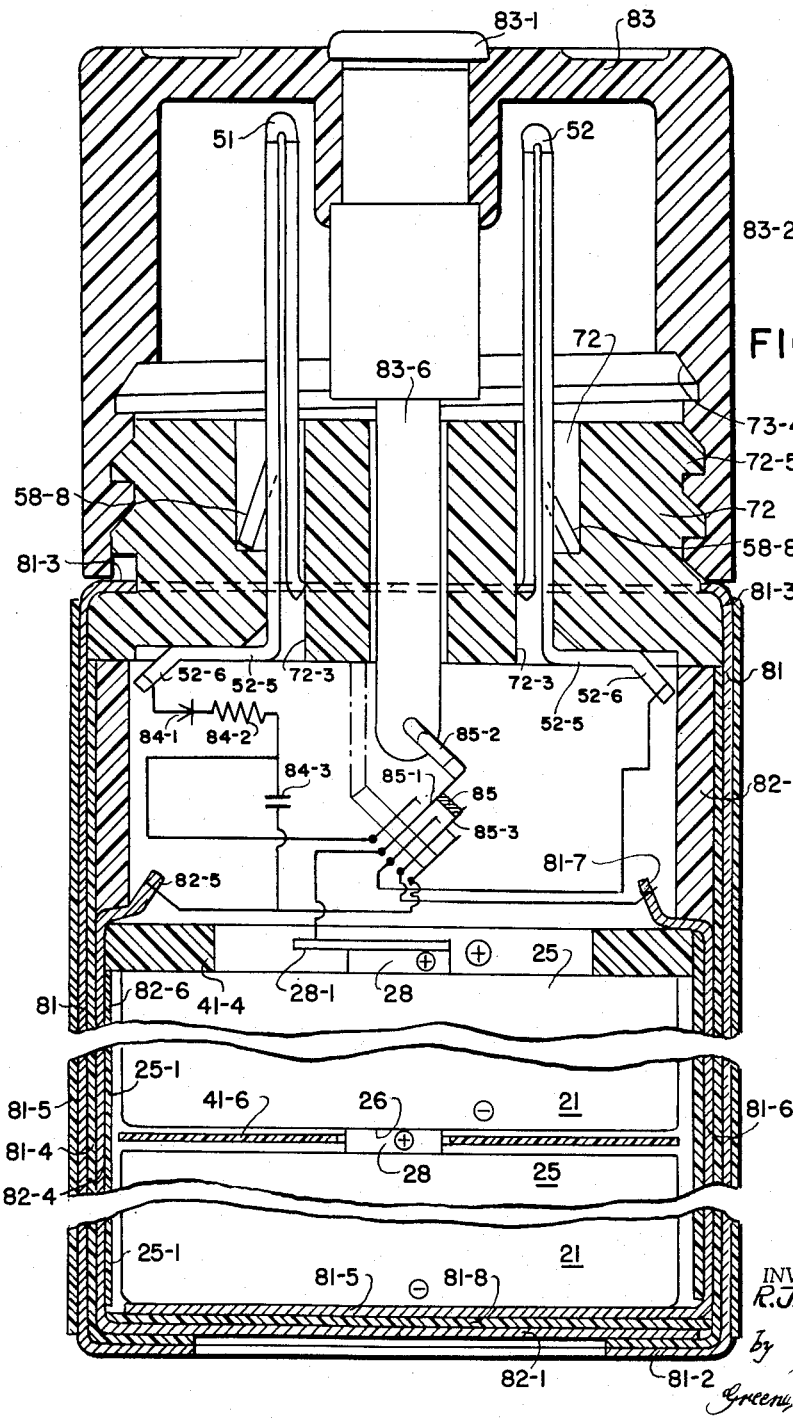
FIG. 3 is a generally diagrammatic view of a rechargeable battery unit exemplifying the invention.
Figure 4:
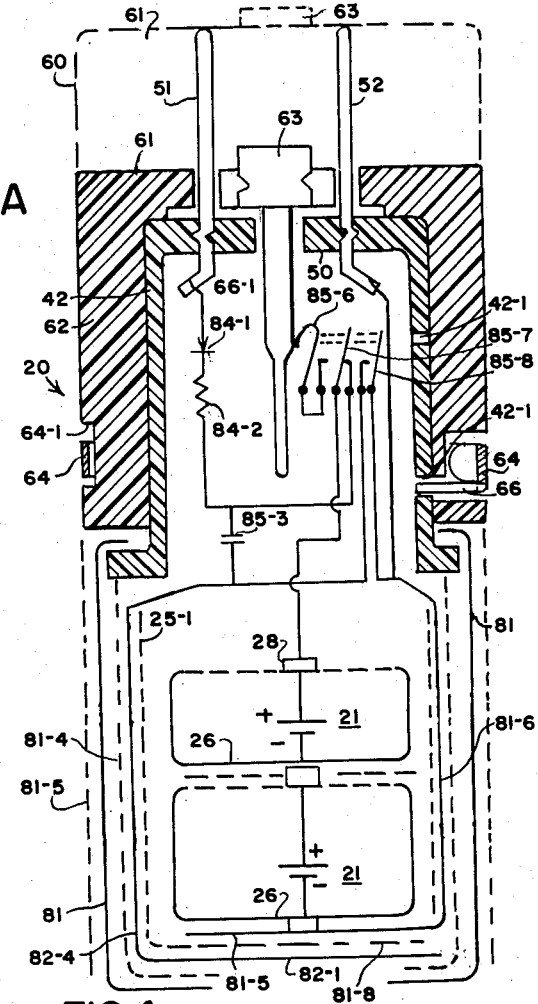
Figure 3B:
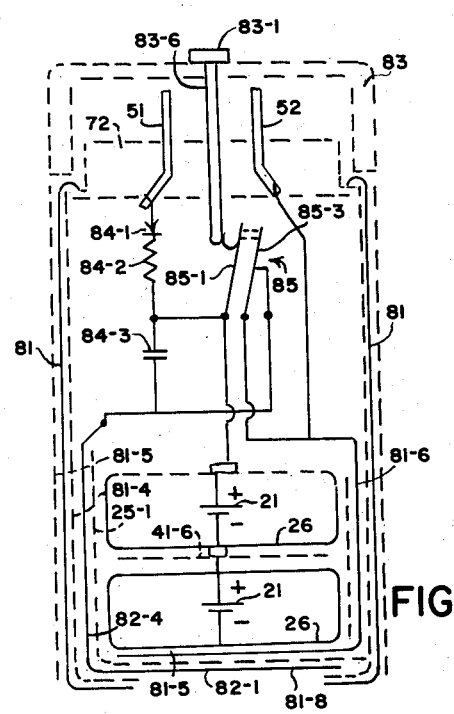
Figure 5:
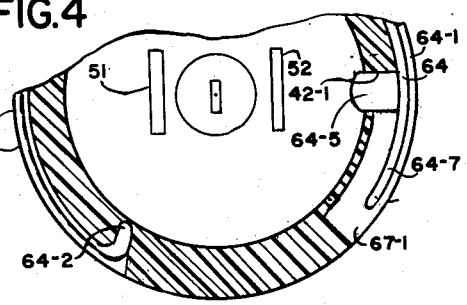

FIG. 3-A is a schematic diagram of the relation of the electrical components of the battery unit of FIGS. 2 and 3;

FIG. 3-B is a schematic diagram, as in FIG. 3-A, of a similar battery unit having a simplified switch arrangement;

FIG. 4 is a schematic diagram as in FIG. 3-B, having a modified arrangement for exposing on its exterior either its output terminals or its recharging input terminals; and FIG. 5 is a horizontal, cross-sectional view of the battery unit of FIG. 4.

For the sake of clarity and simplification of the description, most of the structural dimensions are enlarged, and some of the structural dimensions are shown exaggerated.

To illustrate the application of the rechargeable battery unit of the invention, it will be described in connection with one form of a conventional flashlight of the type designed for operation with a plurality or aggregate of conventional, cylindrical dry battery cells, such as the "D" cells, which are 2¼" high and 1¼" in diameter. Such conventional flashlight has a cylindrical casing 10, in most cases of metal, having a wider front or upper end portion 10—1 holding therein a reflector 13 and light bulb 15.

To simplify the description, the upper end of the flashlight housing 10 and its battery unit 20, as seen in the drawings, will be designated as the front or upper end, and the opposite end parts thereof will be designated as the rear or bottom end thereof. The outer rim of the reflector 13 and an overlying transparent lens 13—1 are clamped against the upper rim edge of the wider upper casing end 10—1 by the reentrant inward edge region 11—1 of a lens collar 11—2. The lens collar 11—2 is affixed to the wire upper casing end 10—1 by conventional threaded engagement of their facing surface portions. By way of example, the shown light bulb 15 is of the type having its conventional glass neck portion 15—1 affixed within a metallic bulb terminal collar 15—2 holding affixed in its lower open end, by an insulating junction body 15—3, the central, downwardly-facing bulb terminal 16. At its upper end, the bulb terminal collar 15—2 has a circular contact flange 15—4 by which it is held in central position within the reflector 13 and electrically connected to a metallic contact sleeve or member 14 of the flashlight insulatingly held in the central downward region of reflector 13. The two terminal leads of the electric filament of light bulb 15 which are sealed through its glass neck 15—1, are connected to its terminal collar 15—2 and its central terminal 16, respectively.

In the form shown, the main cylindrical part of central contact sleeve 14 has at its upper end a circular, coaxial clamping collar 14—1 of narrower width, and with an opening large enough to permit the wider portion of the light bulb 15 to pass therethrough. The downward side of the narrow upper collar 14—1 of contact sleeve 14 is adjoined by a circular, concentric wider seating section 14—3 shaped to receive and hold fixed in position the circular metallic flange 15—4 of the light-bulb terminal collar 15—2. The seating section 14—3 of the contact sleeve 14 is adjoined by the wider axially-extending main part thereof which has at its downward end a circular laterally-projecting bottom contact flange 14—4.

The contact sleeve 14 is held insulated from the metallic casing of the flashlight. In the form shown, the reflector 13 is of insulating material and provides the insulating support for the central contact sleeve 14 which is connected through the flange of bulb terminal sleeve 15—2 to one end of the light filament (not shown) of the light bulb 15. A conventional reflector 13 is formed, as by molding, of transparent insulating resin material, and its downwardly facing main rear surface is coated with a metallic reflector film, aluminum for instance, which reflects the bulb light as a light beam through lens 13—1. The central metallic contact sleeve 14 is suitably affixed to the central inward region of the reflector 13. In the form shown, the reflector 13 is provided at its center with an uncoated, downward insulating sleeve 13—2 fitting over the upper collar 14—1 and the main circular concentric part of the contact sleeve 14, being held affixed thereto by locking engagement between the central region 14—5 of bottom contact flange 14—4 of contact sleeve 14 and the crimped-over upper collar edge 14—2 of the narrower sleeve collar 14—1.

The light bulb 15 is held detachably affixed to reflector 13 by clamping the circular collar flange 15—4 of its metallic terminal collar 15—2 within the metallic seating section 14—3 of the surrounding contact sleeve 14 by clamping sleeve 14—6 of insulating material. The clamping sleeve 14—6 may be molded of suitable synthetic resin, and its outer surface has conventonal threaded engagement with the facing threads of the surrounding contact sleeve 14. The light bulb 15 may be replaced in its fixed positon shown within the contact sleeve by gripping the projecting lower end of the clamping collar 14—6 and unscrewing and removing it from the contact sleeve 14 and then screwing it back in the clamping position shown after a new light bulb 15 has been placed in the shown operative position.

Figure 1:
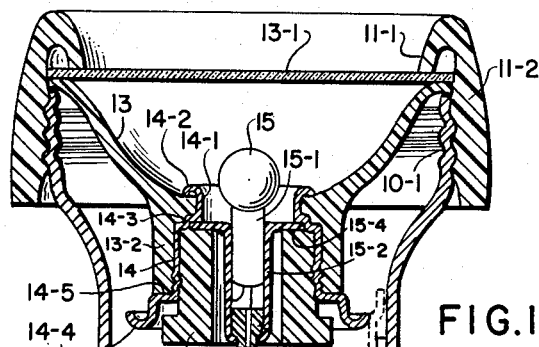
FIG. 1 is a cross-sectional view of a conventional flashlight equipped with a rechargeable battery unit exemplifying the invention.

The casing of a conventional flashlight, of the type shown in FIG. 1, is in most cases provided with two spaced oppositely-facing flashlight terminals holding under contact pressure and electrically connecting between them an arrayed column of a plurality of cylindrical battery cells. Thus, by way of example, in the flashlight of FIG. 1, the central bulb terminal 16 forms one relatively fixed terminal of the flashlight casing 10, and the metallic bottom wall 11 of the flashlight casing with its metallic contact spring 11—5, forms the opposite relatively fixed terminal of the flashlight casing. In a conventional flashlight, a column of cylindrical, conventional dry battery cells is held under pressure in series connection between such relatively fixed opposite flashlight terminals 16 and 11.

The interior surface of lens collar 11—2 may be provided with an inward circular locking ridge projection for retaining therein the reflector 13 with the lens 13—1 together with the light bulb 15 and associated elements held fixed at the center of the reflector 13. To replace used dry cell batteries with such arrangement, the lens ring 11—2 together with the reflector 13, light bulb 15 and other elements held herein, is unscrewed and removed from the top of the flashlight casing 10, whereupon the dry cells held in the interior of the casing are dropped through the inverted open top end of the flashlight casing 10. After dropping or placing a column of fresh battery cells through the open top and into the longitudinal battery compartment of the flashlight casing 10, the lens ring 11—2 with its reflector 13 and bulb 15 are screwed back and affixed to the open upper end 10—1 of the flashlight casing 10. This establishes electric contact connections of the relatively fixed opposite flashlight casing terminals 16 and 11 with the opposite-polarity end terminals of the battery-cell column.

As in many generally used flashlight casings, the bottom end wall 11 of the flashlight casing may have a rim (not shown) by which it is threadedly connected with the threaded end portion of the adjoining side walls of the flashlight casing 10, to permit removal and replacement of a column of dry battery cells within the battery compartment of the flashlight casing 10 by unscrewing and then screwing back in place the detachable bottom end wall of such flashlight casing. In another form of conventional flashlight (not shown), the flashlight casing has a side wall which may be removed or opened for replacing used-up dry cells or a dry-cell battery assembly within the casing, by a fresh dry-cell battery assembly.

A conventional flashlight of the type shown is also provided with a switch for selectively opening and closing the circuit connections from the opposite terminals of the battery aggregate to the circuit which energizes the filament of the light bulb 15. A variety of known flashlight switches may be used for this purpose. By way of example, the switch of the flashlight of FIG. 1 has a slidable metallic switch contact member 10—2 held along an inward wall surface of the metallic flashlight casing 10 by an actuating grip or button 10—3 overlying a longitudinal opening 10—4 of the casing 10. In the form shown, movable switch contact member 10—2 is formed of a strip of electrically-conductive spring sheet metal such as a copper-base alloy used in conventional flashlight switches. The movable switch strip 10—2 has near its upper end an inwardly offset contact portion 10—5 arranged so that when the switch strip 10—2 is moved upwardly along the inward face of the underlying wall of flashlight casing 10, the offset switch contact portion 10—5 is wedged in contact engagement between the periphery of circular contact flange 14—4 of the contact sleeve 14 and the underlying metal wall of flashlight casing 10, thereby connecting the bottom end terminal of the flashlight battery 20 by way of the metal casing 10 to the filament of the light bulb 15, the filament circuit being completed by the connection of the flashlight bulb terminal 16 with the upper end terminal of the battery 20.

A guide portion 10—6 of the lower region of switch contact strip 10—2 overlying the longitudinal wall slit 10—4 of flashlight casing 10, is laterally offset in outward direction so that its side edges project through and fit within the longitudinal guide slot 10—4 of the flashlight casing for restraining the switch strip 10—2 in its upward and downward switching motion when actuated by the overlying exposed grip button 10—3. The grip button 10—3 may be made of metal, or molded of synthetic resin, as shown. The offset guide portion 10—6 of switch strip 10—2 is suitably secured, as by a rivet 10—7, to the overlying switch button 10—3. The downward end portion 10—8 of the switch strip 10—2 projecting beyond its guide section 10—6 is inwardly bent to provide a recess shaped for releasable engagement with a locking dimple 10—9 formed in the overlying well portion of casing 10 for retaining the contact strip either in the open switching position in which it is shown, or in the closed upwardly-moved position wherein the casing dimple 10—9 engages the inwardly slightly offset contact-strip end 11—3.

Figure 3A:
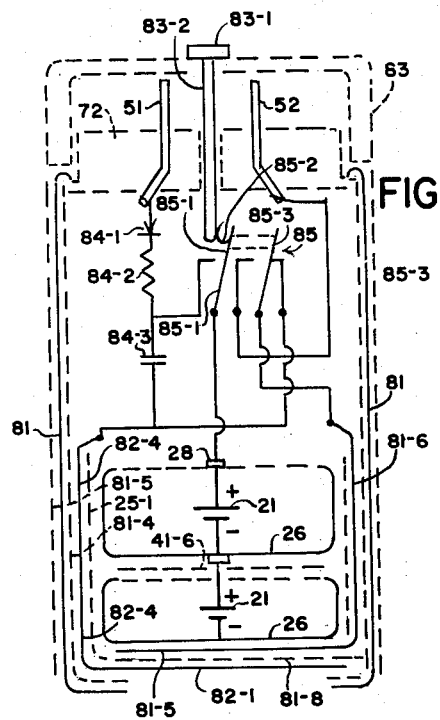

FIGS. 3 and 3A show one form of rechargeable battery unit of the invention for use in flashlights and in other generally analogous applications. It has a battery structure which forms the principal part thereof, and is enclosed in a casing 71 which is shown as consisting of a generally tubular or cylindrical metallic casing structure. However, the casing 81 of the battery unit may be formed of synthetic resin. Within the casing 81 of the battery unit is held an aggregate or column of battery cells 21. The battery unit has at one or the bottom end thereof, one battery terminal 26, and at its opposite or top end an opposite battery terminal 73—1 arranged to be held under contact in a tubular battery compartment of a flashlight casing, such as shown in FIG. 1, between the upper and bottom flashlight terminals of the flashlight casing. The battery cell aggregate may contain any number of similar battery cells 21 or only a single battery cell. In the form shown, the lower battery terminal 26 is formed by the exposed bottom wall 26 of the metallic casing 25 of the bottom battery cell 21. Each battery cell contains at least one pair of electrode plates 22, 23 of opposite polarity, and a porous, electrically insulating separator sheet 24 extending between and separating the plates and holding electrolyte, through which electrolytic action is maintained between the electrode plates 22, 23. The superposed, opposite-polarity electrode plates may be coiled or wound into a coiled electrode structure held in the cell compartment with the axis of the coiled electrode structure parallel to the major or vertical axis of the battery unit. The electrode assembly of each cell 21 is enclosed in a gas-and-liquid-tight cell casing 25, of metal for instance, having a bottom wall 26 and top wall 27, having affixed thereto an upwardly-projecting central metallic cell terminal 28 which is insulated from the surrounding region 29 of the top wall 27 by insulating barrier or loop 31 sealingly affixed to the facing surfaces of metallic cell terminal 28 and metallic top wall 27. However, the battery cells 21 may contain other forms of cell electrodes, such as stacked electrodes.

The electrode assembly of each cell 21 has the electrodes of one polarity connected to the insulated battery terminal 28, as shown by the connection of positive cell electrode 22 to terminal 28, and the electrodes of opposite polarity are connected to the metal wall of the casing 25, as shown by the connection of the negative cell electrodes 23 to the bottom wall 26 of the metal casing 25. In the form shown, each battery cell 21 thus has two opposite-polarity metallic terminals at opposite ends thereof so that an aggregate of a plurality of such cells may be assembled as a column in superposed relation with the central terminal 28 on the top of each cell of the column making contact connection with the bottom wall electrode 26 of the next higher cell of the cell column, and thereby serially connecting all battery cells 21 of such cell column. Although the battery unit is shown as having only two cells, similar battery units may be made with a larger number of battery cells 21 arrayed in a cell column, and also with a number of such cell columns arrayed parallel to each other, with the side walls of each cell column being electrically insulated from each other.

The upper metallic battery terminal 83—1 is held fixed in a movable upper terminal end wall 83 of the battery unit, which is of insulating material such as a suitable, known synthetic resin. Underlying the movable upper terminal end wall 73, is a power input or coupling end wall 72 which is affixed to the upper end of the battery casing 81 and forms the upper casing wall of the battery structure. The upper metallic battery terminal 83—1 projects above the upper level of its movable end wall 83, and it has an inwardly-projecting, elongated metallic connector plug or member 83—6 arranged for detachable coupling with a cooperating contact element 85—2 of the battery structure, and through which the upper battery terminal 83—1 is connected to the upper terminal 28 of the topmost battery cell 21 of the column of battery cells held fixed within the battery casing 81. Within the upper coupling end wall 72 of the battery structure, are held fixed two outwardly-projecting power terminal plugs 51, 52 with which the battery structure is connected to a domestic electric power supply circuit for supplying charging current and recharging the battery cells 21.

The movable upper terminal end wall 83 forms part of a tubular or cylindrical casing section 83—2 providing a compartment which encloses the upwardly-projecting power terminal plugs 51, 52 of the casing coupling wall 72 and is arranged to be detachably affixed to the underlying coupling end wall 72 of the battery structure casing 71. In the form shown, the coupling end wall 72 of the battery casing 71 has an upward wall section with helical threads 72—5 shaped for threaded engagement with corresponding threads on the facing inward surface of the lower part of the surrounding casing section 83—2 of the movable terminal end wall 72 and thereby joining them into the complete battery unit.

In accordance with the invention, a rechargeable battery unit of the type described herein, having one set of exposed metallic power output terminals through which it is connected to the load circuit of a flashlight or other load device supplied thereby, and a further set of power-input or recharging terminals that are to be connected to a relatively high-voltage, high-capacity electric power supply for supplying recharging current, achieves such protection against high-voltage and high-power shocks without the use of a transformer with mutually insulated primary and secondary transformer windings, for insulating the cell aggregate and any exposed metallic circuit portions or terminals of the battery unit from the power-input terminals which are connected to the high-voltage, high-power external power supply.

In accordance with the invention, the desired insulation of exposed metallic circuit portions of such battery unit is secured without an insulating transformer, by combining its charging circuit with switch means and movable setting means or setting member arranged so that when the battery unit is to be connected to the external, higher-voltage battery-charging power circuit, the movable setting means are held in an input position or setting wherein it actuates the associated switch means to disconnect any exposed metallic terminals or metallic portions of the battery unit from the cell aggregate which is being recharged. The movable setting means of the battery unit is arranged to be moved from its input position or setting to a battery output position or setting wherein the associated switch means restore or reestablish the circuit connections from the cell aggregate of the battery unit to its two exposed output terminals through which it is connected to the load circuit for supplying battery operating power thereto.

As an example, a battery unit of the type described herein, may be provided with a charging circuit and switch means associated therewith, which are operable by a movable setting means or setting member of the battery unit either (a) to an input switch setting for recharging the cells of the battery unit and also electrically insulate any exposed metallic battery output terminals or other metallic portions of the battery unit from the higher-voltage, high-power external power supply, or (b) to an output switch setting wherein the switching means reestablish the connections of the cell aggregate of the battery unit to its exposed battery output terminals through which the cell aggregate supplies battery power to the load device operated thereby. The upper casing terminal wall 72 of FIG. 3, 3–A has two outwardly-projecting recharging power input plugs 51, 52, whereby the battery structure is plugged in into a socket of a relatively high-voltage, high-capacity domestic power supply for recharging the battery cells when the associated setting member formed by the upper terminal end wall 83 of the battery unit is removed from its output position or setting shown, to an input position or setting which exposes the power input terminals 51, 52 on the top of the casing terminal wall 72. The upper terminal end wall 83 constitutes with the upwardly projecting upper battery output terminal 83—1 affixed and carried therein, the movable setting means or member thereof.

In the battery unit of FIG. 3, 3–A, the casing 81 has at the bottom thereof a distinct, exposed metallic battery output terminal 82—1 shown in the form of a metal sheet blank which is held insulated by an insulating spacer 81—8 from the overlying metallic bottom cell casing wall and therminal of the lowest battery cell 21 of the cell aggregate held in the battery casing 81. A metallic connector shown in the form of an insulated connector strip 82—4 extends along the inner wall surface of the battery casing 81 from the insulated bottom output terminal wall 82—1 of the battery unit, and terminates in an upper stripped connector lug 82—5 which is exposed in the interior of the battery unit under the inward or bottom side of the insulating casing terminal wall 72. A metallic connector sheet 81—6 underlying and making contact engagement with the metallic bottom casing and terminal end wall 26 of the lowest battery cell 21 of the battery unit, is connected through a similar insulated metallic connector strip 81—6 extending along the inner wall surface of the battery casing 81 and terminates in a stripped, metallic connector lug 81—7 which is exposed under the inward surface of the upper casing terminal wall 72 of the battery unit.

The upwardly-projecting battery output terminal 83—1 of the movable upper terminal wall and setting member 83 has an inwardly-extending metallic connector rod or pin 83—6 which is free to move or pass through an opening in the insulating casing top wall 72 to the under side of the insulating casing terminal wall 72 along which the battery-charging circuit and associated switch means 85 are mounted. For the sake of clarity in illustrating the charging circuits and the associated switch means, the casing 81 of the battery structure is shown provided with an exaggerated, relatively large compartment space underlying thte upper casing terminal wall 72, although very little space is required for these elements of the built-in charging circuit. The charging circuit of battery unit of FIG. 3, 3-A does not have a circuit-insulating transformer, but a battery-charging circuit which is directly connected by its switch means 85 between its charge input terminals 51, 52 and the opposite poles of its cell aggregate 21. The battery unit of FIG. 3, 3-A may be provided with a conventional full-wave rectifying circuit such as described, for instance, in connection with FIG. 3.1 to FIG. 3.4 of "Electronic Circuits and Tubes," published in 1947, by Cruft Laboratory.

The battery unit is shown provided with a half-wave rectifying circuit shown as including a diode 84—1 and a current-limiting resistance 84—2 arranged to be connected through switch 85 between the inner connector lug 52—6 of power input terminal plug 51 and the connector strip 28—1 of the upper terminal 28 of the upper cell 21 of the battery unit. The charging and rectifying circuit is completed by connecting the metal bottom casing and terminal wall 26 of the lowest battery cell of the cell aggregate through the insulated connector lead or strip 81—6 and contacts of switch 85, to the inner connector lug 52—6 of the other power input terminal plug 52 of the battery unit. A capacitor 84—3 is shown connected in a conventional way across the charging circuit for smoothing out the current charges supplied to the cells 21 of the battery unit. The switch 85 may be of any known type, and is shown as a conventional multi-blade switch having two movable switch arms 85—1, 85—3 cooperating with associated switch contacts of the switch which is held suitably affixed to the under side of the insulating upper casing terminal wall 72. In the switch 85 shown, movable switch arm 85—1 has a metallic nose 85—2 which is flexed from the released to an operated position by metallic sliding contact engagement with the inward terminal pin 83—6 of the upper battery output terminal 86—3 when it is moved with its supporting terminal and setting wall member 83 from the removed or charge-input setting to its battery output position or setting shown in FIGS 3, 3-A.

In the shown output setting of the battery unit of FIGS. 3, 3-A, switch 85 is held fixed in the setting by the engagement of the metallic contact nose 85—2 with the inward connector pin 83—6 of the upper battery output terminal 83—1 of the movable setting and terminal wall 83 held in its output setting shown. In this operative output setting position, the switch 85 operates as follows: The flexed blade 85—1 is disconnected from the associated switch blade and is connected through its metallic contact nose 85—2 with the inward connector pin 83—6 of the upper battery output terminal 83—1, and the so-flexed switch blade 85—1 connects the upper output terminal 83—1 of the battery unit to the upper terminal 28 of the upper cell of the column of battery cells 21 held in the battery unit 81. In the shown flexed output setting of switch 85, its other flexed and operated switch blade 85—3 makes contact with one of its associated switch contacts through which the connector lug 82—5 of the exposed bottom output battery terminal 82—1 is connected to upper connector lug 81—7 of the connector strip 81—6 from the bottom terminal wall 26 of the lowest cell 21 of the battery unit. In this shown flexed output setting of switch 85, the exposed upper terminal 83—1 of the battery unit and the exposed bottom output terminal 82—1 of the battery unit are thus connected to the opposite-polarity terminals of the array of superposed and serially-connected battery cells 21 held within the casing 81 of the battery unit.

When the upper terminal wall or setting member 83 is removed from its battery output setting shown, to the input setting thereof wherein the upper casing terminal wall 72 with its two projecting power input plugs 51, 52 are exposed for coupling with socket terminals of a conventional high-voltage, high-capacity electric power supply, the removal of the movable setting and terminal end wall member 83 from its shown battery output position and setting releases the engagement of the inward contact pin 83—6 of its output terminal 82—1 with the nose 85—2 of switch 85, thereby releasing the switch 85 from the flexed operated position shown, to the released non-operated position. When the switch 85 is so released from its flexed power output setting to its released non-operated power input position or setting, it operates as follows:

The released switch contact blade 85—1 makes contact with the associated switch blade through which it connects the upper cell terminal 28 of the upper cell 21 of the battery unit to the charging circuit including serially-connected resistance 84—2 and rectifying diode 84—1, and therethrough to one of the now exposed recharging power input plugs 51, 52 of the battery unit. The other switch blade 85—3, on being released from its shown flexed to the unflexed setting, breaks contact with one of its contact blades and thereby disconnects exposed bottom wall terminal 82—1 of the battery unit from the bottom terminal 26 of the lowest cell 21 of the battery unit. In its released, unflexed position, this other switch blade 85—3 makes contact with its opposite switch contact and thereby connects the bottom terminal wall of the lowest cell 21 of the battery unit to the other recharging power input plug 52 projecting outwardly from the casing terminal wall 72. Thus the release of the switch 85 from its flexed operative battery output setting shown, to the released non-operative and battery input and recharging setting, serves to insulate all exposed metallic terminals including bottom terminal 82—1 of the battery unit shown, from the high-voltage, high-power recharging circuit system when the movable terminal end wall and setting member 86 is removed from its battery output setting shown in FIGS. 3, 3-A and is held in the removed battery input setting or position. A spacer member, for instance in the form of a tube 82—6, of suitable insulating material, positioned along the interior surface of the battery casing 81, may hold the under side of the upper casing terminal wall 73 spaced from the compressed, elastic washer 41—4, for providing the small space for the charging circuit and its switch means 85 while applying through rubber spacer 41—4 the proper bias pressure which holds the column of battery cells 21 fixed in their operative positions between the inwardly-turned bottom rim 81—2 and top rim 81—3 of the metallic casing 81.

The side walls of each metallic cell casing 25 of each battery cell 20 of the battery unit of FIGS. 3, 3-A, may be covered by or enclosed in an insulating coating 25—1 of suitable resin material for insulating the side walls of each metallic cell casing 25 from the surrounding metallic battery casing 81. This feature may also be embodied in all the other battery units shown and described herein. The exterior walls of the metallic battery casing 81 may likewise be coated with an insulating coating 81—5 for keeping it insulated from the surrounding metal parts of the device in which it is operatively mounted.

FIG. 3-B shows diagrammatically a battery unit similar to that of FIGS. 3 and 3-A, having a simplified switch arrangement for assuring that its charging circuit cannot cause shock or injury to an individual. The two power input terminals 51, 52 are permanently connected through the rectifying charging circuit of rectifier 84—1 and resistance 84—2 to the top terminal 28 of top cell 21 and through the insulated connector strip 81—6 to bottom terminal and casing wall 26 of the lowest cell 21 of the cell aggregate. In such simplified arrangement, switch 85 is modified by omitting its two relatively fixed contact blades which cooperate with the two flexed blades 85—1 and 85—3 for connecting the rectifying charging circuit from input terminals 51, 52 to the opposite-polarity cell terminals of the cell aggregate. With the so-modified switch 85, its flexed blade 85—1 with its contact nose 85—2 serves only to connect the top battery output terminal 83—1 to the top terminal 28 of the topmost cell 21, when the movable setting wall member 83 is brought or held in the output setting shown in FIG. 3-B. The other movable switch blade 85—3 has only one cooperating fixed blade shown engaged for connecting therethrough the insulated connector strip 81 of the exposed bottom terminal 82—1 of the battery unit to the covered metallic bottom terminal wall 26 of the lowest cell 21 of the battery unit, when the setting wall member 83 is in its output setting shown, and for opening this switch contact and insulating the exposed battery output terminal 82—1 when the setting wall member 83 is removed from its output setting shown in FIG. 3-A, and expose the input terminal prongs 51, 52 for engagement with a power supply and recharging the battery.

The present invention is also applicable to modified forms of rechargeable battery units of the type described above, wherein the switch-controlling, movable end-wall or setting member is retained on the battery unit both in its input setting when charging its cells, and in its output setting when the battery unit delivers current. One form of such modified battery unit of the invention is shown in FIGS. 4 and 5. It comprises a column of battery cells 21 held assembled in a tubular metallic casing 81 together wtih two metallic bottom terminals 82—4 and 81—6, and insulating coatings or separators 25—1, 81—4 and 81—5, as in the battery unit of FIGS. 2 to 3-A.

The top of the tubular casing 81 of the battery unit 20 is enclosed by a relatively strong upper, tubular casing section 42 having a relatively strong transversely-extending power-terminal or coupling wall 50 (made, for instance of molded insulating resin) holding affixed thereto two outwardly-projecting power input terminal prongs 51, 52. The two outwardly-projecting power supply plug-prongs are of a thickness, height and spacing identical with the terminal plug-prongs of conventional electric power-supply plugs, which are plugged in into an electric wall socket of a domestic power supply circuit for supplying power to an electric appliance connected, as by a cord, to the plug-prongs of such plug. The upper tubular casing section 42 of the battery unit of FIGS. 4 and 5 is narrower or is of smaller width or cross-sectional area than the main cell-enclosing battery casing 81.

The narrower, upper tubular casing setcion 42 of this battery unit 20 carries movably mounted thereon a setting member 60 movable between its inward recharging or power-input setting shown, and its outward power-output setting shown in dash-lines. In the form shown, the movable setting member 60 constitutes a relatively rigid tubular structure, for instance molded of insulating resin material and having an end wall 61 and tubular side walls 62 slidably engaging the tubular side walls of the upper casing section 42 of battery casing 81. The end-wall 61 of setting member 60 holds insulatingly affixed therein an outwardly-projecting upper battery output terminal 63 for supplying in conjunction with the exposed bottom output terminal 82—1 of battery unit 20, cell current to an output load, for instance to a flashlight bulb 15 of FIG. 1, when the setting member is retained in the dash-line output setting.

The upwardly-projecting outward battery terminal 63 of the movable setting member 60 has an inwardly-projecting conductive or metallic rod 63—1 which is free to move or pass through an underlying opening of the upper end wall or upper casing section 42 of battery casing 81. The setting-member end wall 61 also has two openings arranged to permit free passage of the two input terminal prongs 51, 52 of battery unit 20 which project outwardly from the upper end wall 50 of the upper casing section 42 of the battery casing 81. The two outwardly-projecting terminals 51, 52 are of such length that when the movable setting member 60 is in the full-line inward position shown, these two outwardly-projecting terminal prongs 51, 52 are of a length corresponding to the length of conventional terminal prongs of a connector terminal member through which an electrical appliance is connected or plugged in to the socket of a domestic electric power-supply circuit.

The movable end-wall setting member 60 and the casing end-wall section 42 on which it is slidably movable, have interlocking means for interlocking and selectively retaining the setting member with the battery unit 20 either in the dash-line outward output setting or in the full-line inward input recharging setting. As an example, the interlocking means may be formed by an arcuate or circular locking spring 64 of spring metal, for instance, fitting within a corresponding recess 64—1 of cylindrical setting-member side wall 62, and having an inwardly bent end 64—2 (FIGS. 4 and 5) shaped to fit and be secured, as with cement, within a mounting slit of side wall 62. At its opposite end, locking spring 64 has a laterally-bent, stiff locking tongue 64—5 biased to enter into interlocking engagement with either the lower or the upper locking slit 42—1 of cylindrical side walls of upper battery casing section 42 for interlocking and retaining the movable setting member 60 either in its inward recharging setting shown, for recharging its cells from an electric power supply, or for delivering cell current to a load. An end portion 64—7 of locking spring 64 projecting beyond its locking tongue, serves as a grip that may be lifted by a finger for unlocking the setting member 60 from one of its two settings and moving it to its opposite setting wherein it is automatically locked by spring locking-tongue 64—5 automatically dropping into the opposite locking slit 42—1 of battery casing section 42. With such locking arrangement, the setting member 60 of the battery unit will be retained by the interlocking engagement of its locking spring 64 with the upper locking slit 41—1 of upper battery casing section 42, for retaining the setting member 60 on the battery unit 20 in the upper dash-line position wherein the battery unit will supply cell current to a load such as a flashlight through its exposed upper output terminal 63 and its exposed bottom terminal member 82—1.

Within the interior of the upper tubular casing section 42 of battery unit 20, are suitably mounted in a conventional way, the elements 84—1, 84—2, 84—4 of a rectifying battery charging circuit and associated switch means 85—4 of the invention, similar to and operating in a manner similar to corresponding elements described above in connection with FIGS. 3 to 3-B. In the shown input setting of setting member 60, switch 85—4 is flexed to the operated position by engagement of the metallic nose of the first movable blade 85—6, which remains in contact engagement with a portion of the inwardly-projecting metallic rod 63—1 of output battery terminal 63 in the input setting shown, as well as in the dash-line output setting of setting member 60. The flexed switch blade 85—7 makes, with an associated fixed contact blade, a circuit connection from the power input terminal prong 51 through the rectifier 84—1 and current-limiting resistor 85—2 to the upper terminal 28 of the upper cell 21 of the serially-connected column of battery cells 21 of the battery unit. The opposite-polarity terminal 26 of the lowest cell 21 of the cell column is connected through its engagement with the inner, insulated bottom contact plate 81—5 and its direct circuit connection 81—6 to the opposite terminal input prong 52, thereby completing the rectifying charging circuit through which the serially-connected cells 21 of the battery unit are recharged, while the setting member 60 is in the inward charging setting shown. In this inward charging setting, the exposed bottom terminal 82—1 of the battery unit 20, as well as its opposite battery output terminal 63, forming part of the setting member 60, remain disconnected from the live circuit elements of the charging circuits just described, that are connected to the electric power supply.

Upon moving the setting member 60 from its raised, full-line charging setting 60 of the battery unit 20, to its raised dash-line output setting, the bottom end of the inwardly-projecting output terminal rod 63 releases switch 85—4 from its operated position to the released position, wherein the nose of the first switch blade 85—6 remains in contact engagement with the bottom region of the operating contact rod 66—1. In this released position of switch 85—4, its released second switch blade 85—7 connects the nose blade 85—6 and therethrough the upper output contact 63 of setting member 60, to the upper terminal of the top cell 21 of the column of cells of the battery unit 20. In addition, the released third switch blade 85—8 connects the insulated bottom terminal 81—5 of battery unit 20, and therethrough the bottom terminal wall 26 of the bottom cell 21 of the cell column of the battery unit 20, to battery lead 82—4 and therethrough to the exposed bottom terminal output plate 82—1 of the battery unit, for supplying in conjunction with the now-connected top output terminal 63 of the raised setting member, cell current to a load such as a flashlight.

The features and principles underlying the invention described above in connection with specific exemplifications thereof, will suggest to those skilled in the art many other modifications thereof. It is accordingly desired that the appended claims shall not be limited to any specific features or details shown and described in connection with the exemplifications thereof.

I claim:

1. In a rechargeable battery unit for a flashlight and generally similar and analogous devices, having an electric load circuit enclosed in a device casing and two spaced electric device terminals connected to its load circuit, a self-supporting battery unit removable and replaceable in the device casing and holding therein a cell aggregate including at least one rechargeable battery cell and having two spaced terminal walls exposed on the exterior of said battery unit and two output terminal members of opposite polarity affixed to and exposed on said two terminal walls, respectively, and connected to the opposite cell poles of said cell aggregate, said battery unit being arranged to be removably held in said device casing under biasing pressure engagement under said two device terminals, respectively, for supplying electric output from said cell aggregate of said load circuit, an input wall portion of said battery unit carrying two spaced power input terminal members arranged for detachable engagement with two power terminals, respectively, of an electric power supply having relatively high power capacity for supplying electric recharging current to said cell aggregate, a charging circuit connected between said input terminal members and the opposite cell poles of said cell aggregate and including rectifying means for supplying charging current to and recharging said cell aggregate when said two input terminal members are connected to said two power supply terminals, a solid portion of said battery unit constituting a movable setting member movable between an output position setting in which said battery unit is set to supply current through its two output terminal members to said load circuit, and an input position setting wherein said battery unit is set to be recharged through its two input terminal members, and switch means associated with said charging circuit operative in response to said setting member being held in said output setting to disconnect all externally exposed conductive elements of the battery unit which are connected through its power input terminal members to the electric power supply and thereby insulate such exposed conductive elements of said battery unit from the live circuit parts of said charging circuit connected to said output terminal members, whereby exposed conductive portions of said battery unit which are electrically connected to said charging circuit are protected against electric shock from the higher voltage power supply, said switch means being operative in response to said setting member being in said output setting to close and restore the circuit connections through which said cell aggregate supplies current to the load circuit through its two power output terminal members.

2. In a rechargeable battery unit as claimed in claim 1, and actuating means carried by said setting member operative to actuate said switch means to disconnect said exposed conductive elements from said live circuit parts upon removing said setting member from said input setting, and operative to close said circuit connections in response to placing said setting member in its output setting.

3. In a rechargeable battery unit as claimed in claim 2, said two terminal walls and their respective two output terminal members extending along opposite end walls of said battery unit.

4. In a rechargeable battery unit as claimed in claim 1, said two terminal walls and their respective two output terminal members extending along opposite end walls of said battery unit.

5. In a rechargeable battery unit as claimed in claim 2, said battery unit having a coupling structure detachably carrying said movable setting member with its actuating means in its said output settting, said movable setting member being detached from said battery unit in the input setting of said setting member, said input wall portion being exposed on the exterior of said battery unit.

6. In a rechargeable battery unit as claimed in claim 5, said two terminal walls and their respective two output terminal members extending along opposite end walls of said battery unit.

7. In a rechargeable battery unit as claimed in claim 2, said battery unit having a coupling structure detachably carrying said movable setting member with its actuating means in its said output setting, said movable setting member being detached from said battery unit in the input setting of said setting member, said input wall portion being exposed on the exterior of said battery unit, said two terminal walls and their respective two output terminal members extending along opposite end walls of said battery unit.

References Cited in the file of this patent
UNITED STATES PATENTS
2,876,410    Fry _____ Mar. 3, 1959